Oct. 8, 1940. P. E. HAMRING 2,217,112
METHOD OF HULLING OATS AND LIKE KINDS OF GRAIN
Filed June 16, 1938
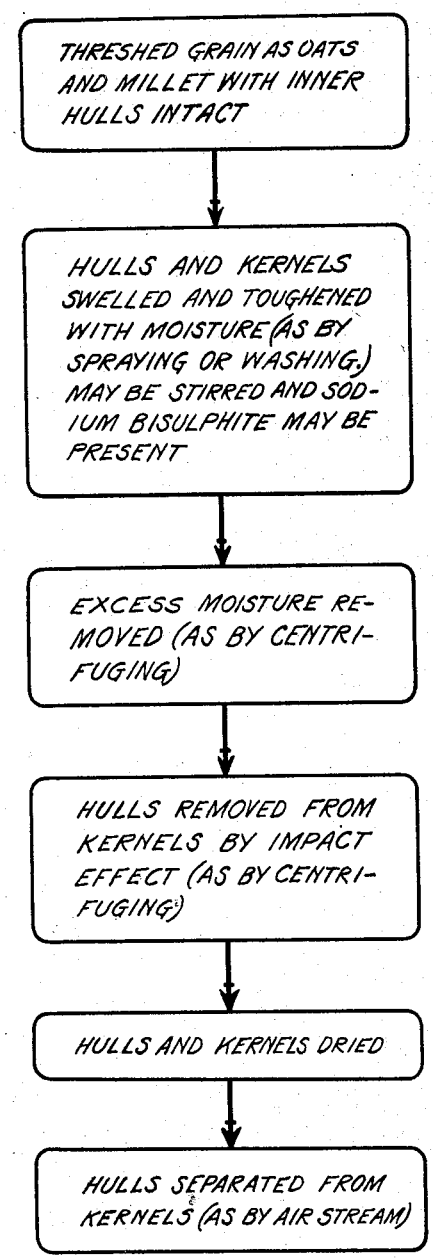
Inventor
Per Emil Hamring
By Stevens and Davis
Attorneys Patented Oct. 8, 1940

2,217,112

UNITED STATES PATENT OFFICE 2,217,112

METHOD OF HULLING OATS AND LIKE KINDS OF GRAIN

Per Emil Hamring, Kvarnholmen, Sweden

Application June 16, 1938, Serial No. 214,141
In Sweden April 5, 1938

3 Claims. (Cl. 83—32)

The present invention relates to a new method of shelling or hulling oats and other kinds of grain which on hulling behave in the same manner as oats, and the object of the invention is to remove the difficulties and disadvantages connected with the hulling process as hitherto used.

Practically all kinds of grain such as wheat, barley and oats have a structure which is basically similar, that is the grain kernel is covered with several integral skin layers known as bran, and contained within two layers of separately formed husks. The inner husks are known as the "palet" and the "lemma" and the outer husks are known as the "glumes." Although these grains are similarly constructed they may be divided into types due to and according to their behavior upon threshing. Most kinds of grain such as wheat and barley may be considered as a type because all of the husks are removed during the threshing operation.

In contrast, oats and millet may be considered as a separate type because only the glumes are removed by threshing and the palet and lemma remain intact due to the fact that they overlap and are tightly glued together. In this condition this type of grain is used as feed for certain live stock such as horses and cattle, but it is necessary to remove the inner husks so that the grain may be rolled, ground or used as feed for other types of live stock such as hogs and the present invention is concerned with a process for removing these inner husks, the palet and lemma, from this type of grain.

In the known process of hulling oats practised in the oat-flake mills the oats has first been dried down to a low moisture content (about 5–6%) which has caused a shrinking of the oat-grain kernel so that the kernel and the hull can afterwards be separated more easily from each other by mechanical means. Before hulling can take place in this process the oats must first be sorted into 4 to 8 fractions of different grain size, each of which must be passed separately through the hulling apparatus, since the small grains would otherwise not be attacked and hulled at all, while the larger grains would be wholly or partially crushed.

Hitherto the hulling process has been carried out almost exclusively by means of emery stones, and every time a fraction of new grain size was to be subjected to hulling it was necessary to regulate the hulling stones correspondingly. But even the most exact regulation cannot prevent the crushing of a lot of grains which are very brittle after the hard drying. Moreover, on account of the irregularity of the oat grains and the existence of twin grains and inner grains it is not possible to carry out the sorting of the grains in such a way that all grains with kernels of equal size are assembled in the same fraction. Owing hereto and also on account of an unavoidable abrasion of the kernels from which the outer part is ground away, considerable losses have arisen in said hulling process.

The present invention now relates to a new hulling process by means of which said losses are wholly eliminated, and at the same time the working procedure is simplified. The novel features that are considered characteristic of the invention are set forth with particularity in the appended claims. The invention itself, however, both as to its organization and operation will best be understood from the following description of the specific process when read in connection with the accompanying drawing which comprises a flow sheet illustrating the process.

Contrary to previous methods according to which the oats before hulling has been subjected to a drying (shrinking of the kernel) in order to facilitate the removal of the hull from the kernel, the present invention is based upon the observation that by a preliminary swelling of the grain, the hulling may be facilitated in such a degree that only a slight impact effect is required to separate the hull from the kernel, without any treatment in scourers or the like. Moreover, this result can be obtained without a preliminary sorting of the grains in several fractions and without injury, crushing or abrasion of the grain kernels.

The swelling of the grains according to the invention is effected by causing the grains to absorb a sufficient quantity of moisture, for instance by spraying water over the same, in which operation the grains are preferably stirred, so as to obtain a uniform moistening. The quantity of water used may be such that the grains, if desired, are subjected to a complete washing, whereby foreign mater (dirt, etc.), sticking to the surface of the grains or present in the bulk of the grain is removed, which from a hygenic point of view is important. The water may be of common or increased temperature and further it may contain chemicals suitable for such a treatment, for instance sodium bisulphite. In some cases the treatment may also be carried out by means of steam.

For every kind of grain and every type of a certain grain, for instance different kinds of oats, the combinations, that is the quantity and temperature of the moistening liquid, the duration of the treatment, etc., are regulated in such a way that the degree of swelling is obtained by which the hulling can then be performed most easily by striking or impact effect, which can be established by preliminary attempts.

When the water treatment has been accomplished, the grains are preferably freed from the water sticking to their surfaces by centrifugal action and are then, after the swelling has taken place in a sufficient degree—without drying or sorting—ready to be subjected to a striking action or impacts against a wall or the like, whereby the hulls are loosened from the kernel, for instance a machine of centrifugal type, in which the hulling may be effected in one or more stages. As by the preliminary treatment the grain has obtained a very great toughness, it will be crushed by the impact against the wall, but the kernel will come out of the hull quite intact.

After the hulling has been effected in this manner, the whole mass is dried according to requirement, and the hulls are then separated from the kernels by suction or blowing. The quantity of kernels obtained which has only a small volume in comparison with the original volume of the oat-grains and is not difficult to sort may thereafter be easily divided into a couple of fractions of different grain size to facilitate the separation on the paddy tables of unhulled grains which still may be present. These grains which in the present process do not amount to more than about two or three per cent, are then taken back to the water treatment stage.

In addition to the direct advantages in the hulling process itself which are attained by the present invention, not only a better recovery is obtained but also a better quality of the product subsequently produced from the oats thus treated, for instance oat-flakes. The surface layer of the kernels with the valuable substances contained therein is not abraded in the hulling process. Further a completely automatic working is obtained, for instance in the production of oat flakes, which has not been possible when using the production methods hitherto used.

In the foregoing the invention has been described preferably in connection with the treatment of oats, but the method according to the invention may with the same advantages also be applied to other kinds of grain which on hulling behave in the same manner as oats, for instance millet.

Having now particularly described the nature of my invention and the manner of its operation what I claim is:

1. In a process for removing the inner husks from threshed grain, which comprises treating the grains with moisture, thereby causing a swelling of the grains and loosening of the inner husks and then subjecting the swelled grains to hulling by striking effect.

2. In a process for removing the inner husks from threshed grain, which comprises spraying water over the mass of grain, at the same time stirring the grain to ensure a uniform moistening, thereby swelling and toughening the grain kernels and loosening the hulls, removing water sticking to the surface of the grains by centrifugal action, and then subjecting the grains to hulling by impacts in an apparatus of centrifugal type.

3. In a process for removing the inner husks from threshed grain, which comprises moistening the grain, thereby causing a swelling and toughening of the grains and a loosening of the husks, subjecting the swelled grains to hulling by impacts, drying the whole mass, and then separating the hulls from the kernels by means of an air stream.

PER EMIL HAMRING.

CERTIFICATE OF CORRECTION.

Patent No. 2,217,112. October 8, 1940.

PER EMIL HAMRING.

It is hereby certified that error appears in the printed specification of the above numbered patent requiring correction as follows: Page 1, second column, line 44, for "mater" read --matter--; page 2, first column, line 1, for the word "combinations" read --conditions--; line 19, after "will" insert --not--; and that the said Letters Patent should be read with this correction therein that the same may conform to the record of the case in the Patent Office.

Signed and sealed this 12th day of November, A. D. 1940.

(Seal)

Henry Van Arsdale,
Acting Commissioner of Patents.